April 8, 1930.  J. H. MINER  1,753,899
STALK CUTTER
Filed Sept. 6, 1928
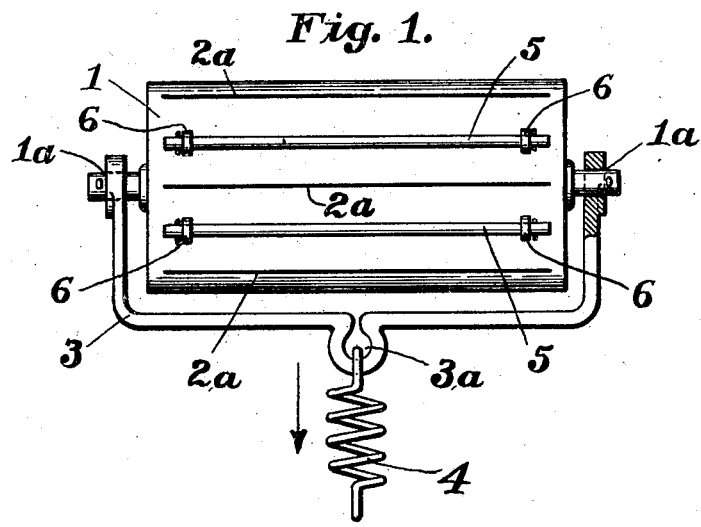
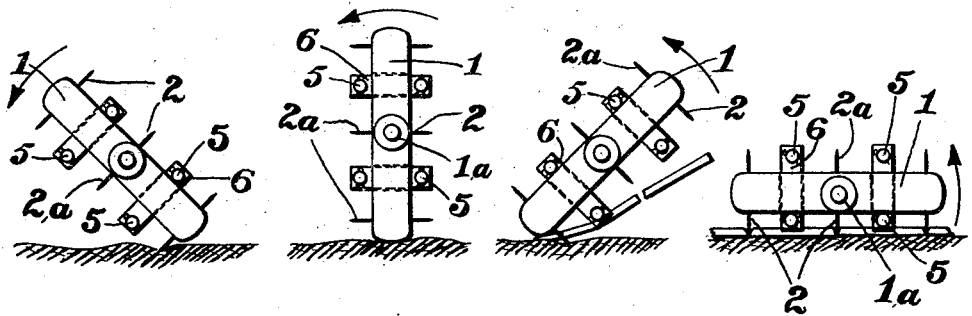
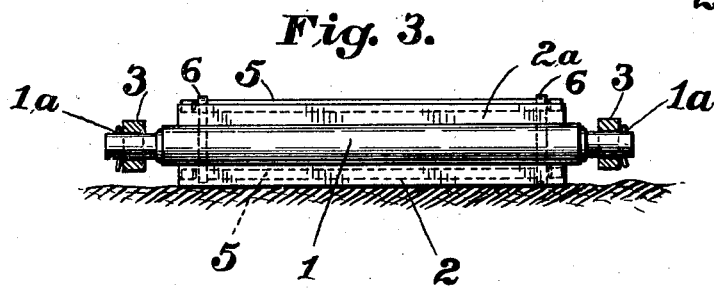
Inventor:
James H. Miner,
by Spear, Middleton, Donaldson & Hale
Attys.

Patented Apr. 8, 1930

1,753,899

UNITED STATES PATENT OFFICE

JAMES H. MINER, OF MERIDIAN, MISSISSIPPI

STALK CUTTER

Application filed September 6, 1928. Serial No. 304,291.

My said invention relates to devices for cutting stalks, such as corn and cotton, weeds, etc., which are lying flat on the ground preparatory to plowing them under, and the invention aims to provide a simple, economical and durable device operating in a novel and effective manner; such stalks, etc., lying flat having been difficult to cut by any means of which I am aware, and unless cut into short lengths will not be turned under by the plow.

The invention includes the novel apparatus hereinafter described and defined by the appended claims.

What I at present consider the preferred embodiment of the invention is illustrated in the accompanying drawings in which:

Figure 1 is a plan view of the device.

Fig. 2 is a side elevation.

Figs. 2$^a$, 2$^b$, and 2$^c$ are similar views showing different positions in operation, and Fig. 3 is a front elevation.

Referring by reference characters to this drawing, the numeral 1 designates a substantially rectangular cutter carrying member which is made relatively heavy for the purpose hereinafter described. 2 and 2$^a$ designate cutting blades which are arranged in parallel planes vertically of the carrying member, those indicated at 2 being located at one side of the frame and facing in one direction, and those at 2$^a$ being oppositely positioned and facing in the opposite direction.

3 designates a bail or draft member pivotally connected to the frame at 1$^a$ and having a draft eye or the like 3$^a$ for connection of a flexible draft device 4 to be drawn by horse or tractor. In operation, draft being applied in the direction of the arrow, the knives on the front side dig into the ground and the continued pull on the bail causes the rear end to rise (Fig. 2$^a$), and swing forward on the front blade and rounded front edge as a fulcrum point until the frame passes the vertical Fig. 2$^c$ and the weight of the frame and knives in falling causes the lower knives to effectually cut or chop the stalks, etc., in short lengths. The draft device being flexible as described, offers no resistance to the falling action.

Thereafter the operation is repeated as long as draft is maintained.

In order to prevent any clogging of the knives by the cut stalks, etc., I provide gravity operated clearers in the shape of bars 5 lying between the blades on opposite sides of the carrying member and connected by cross bars 6 passing loosely through vertical openings in the carrying member. As the member tilts up off the ground (Fig. 2$^a$), the cross bars drop by gravity and push the cut stalks, etc., clear of the knives.

Due to agricultural methods, in many localities, the stalks lie on the ground in rows and it is obvious that my invention may comprise a frame having a plurality of blade carrying members for operating on two or more rows at a time.

Having thus described my invention, what I claim is:

1. A stalk cutter comprising a knife carrier having substantially flat faces, rows of knives disposed perpendicular to said faces and means for causing the knives to descend on the stalks by gravity.

2. Apparatus according to claim 1 having blade clearers comprising bars disposed between the blades on opposite sides of the carrier connected by cross bars passing freely through openings in the carrier.

3. A stalk cutter comprising a substantially rectangular knife carrier having oppositely facing substantially flat sides, a plurality of knives carried by each face substantially perpendicular thereto, and means for causing the carrier to repeatedly turn over.

4. A stalk cutter comprising a body of substantial weight having opposed flat faces of width greatly exceeding the thickness of the body, knives carried by said flat faces substantially perpendicular thereto, and a flexible draft device pivotally connected centrally to the ends of the body.

5. A stalk cutter comprising a body of substantial weight having opposed flat faces of width greatly exceeding the thickness of the body, and having rounded side edges, knives carried by said flat faces substantially perpendicular thereto, and a flexible draft device pivotally connected centrally to the ends of the body.

In testimony whereof, I affix my signature.

JAMES H. MINER.